F. A. OSTLER.
SPRAYING TANK.
APPLICATION FILED DEC. 27, 1920.
1,430,840.
Patented Oct. 3, 1922.
2 SHEETS—SHEET 1.
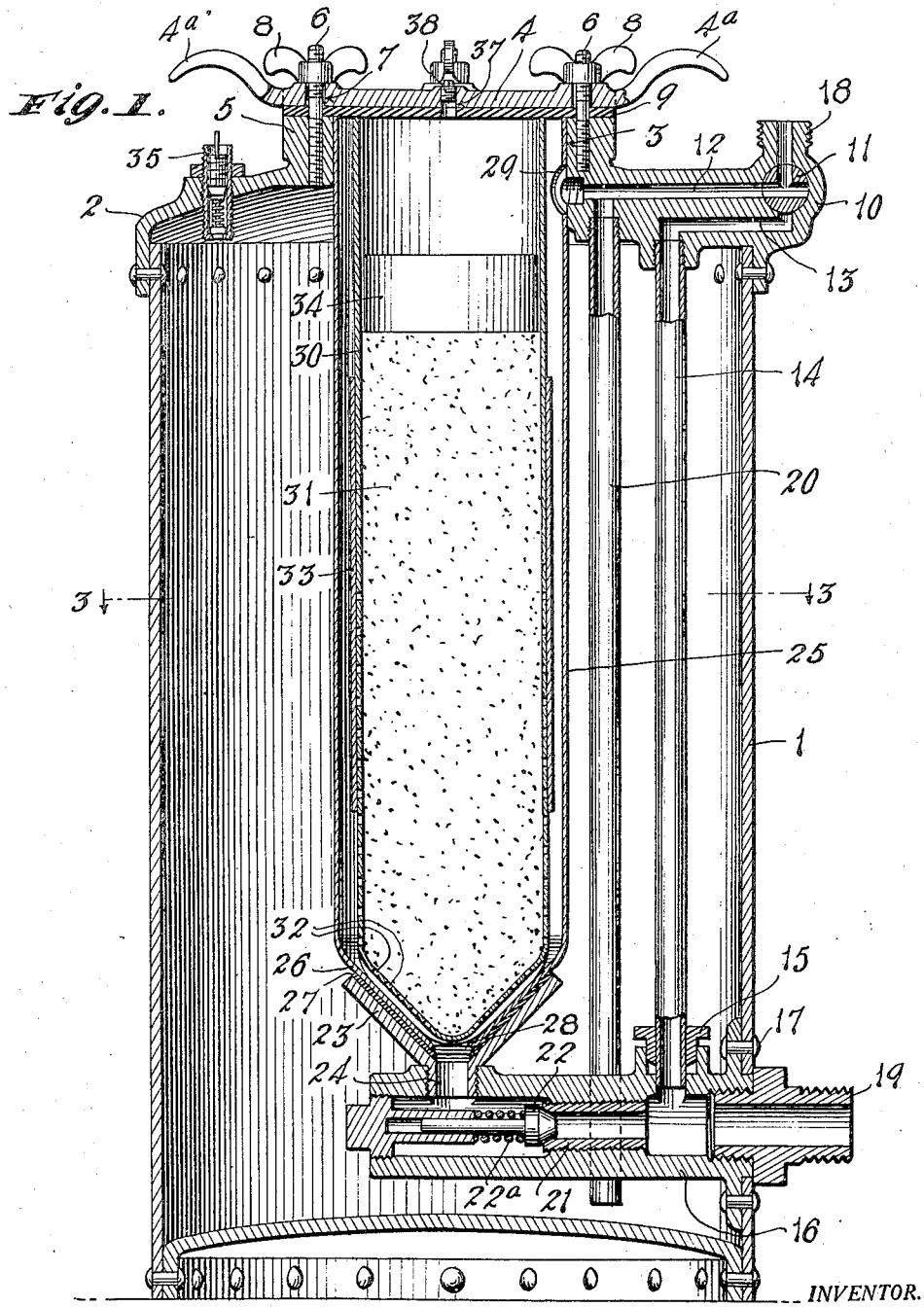
INVENTOR.
Francis A. Ostler,
BY
Everett Rook.
ATTORNEYS.

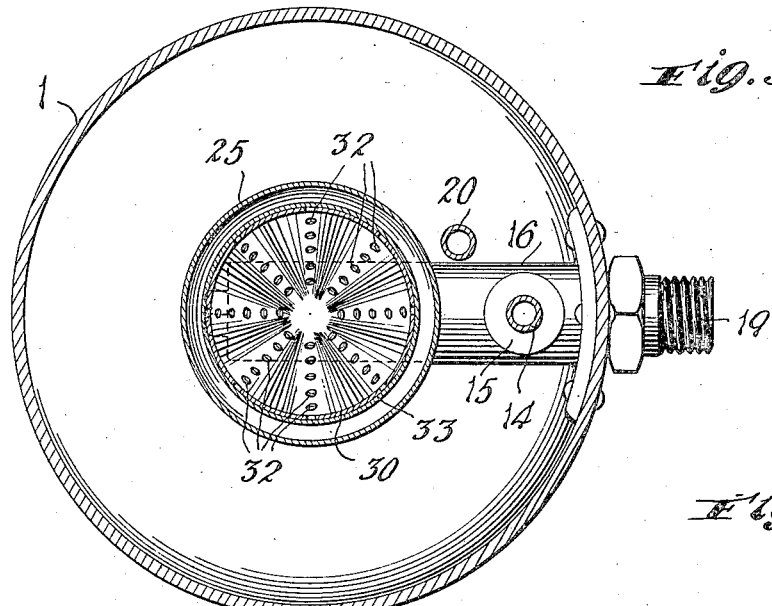
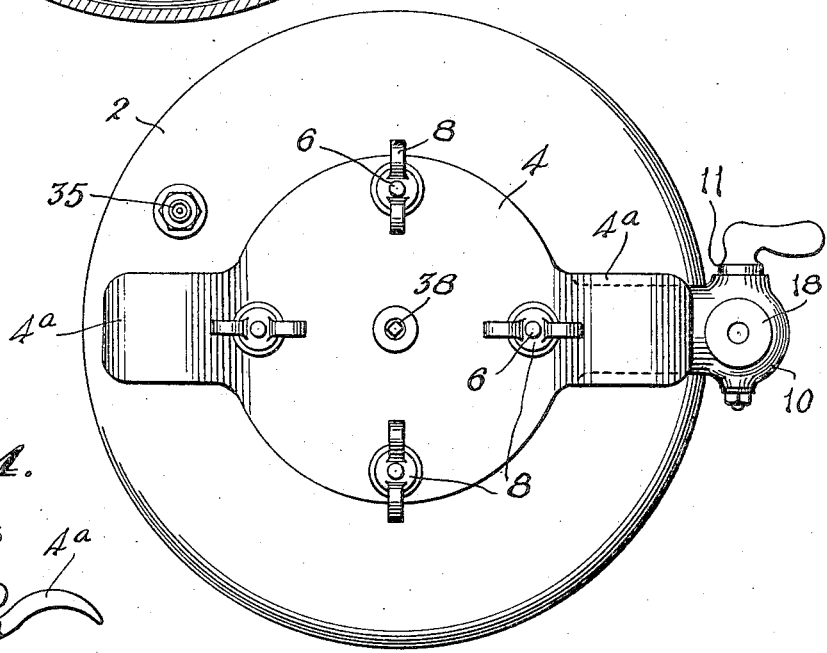
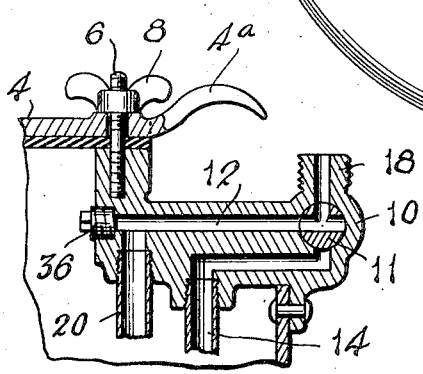

Patented Oct. 3, 1922.

1,430,840

UNITED STATES PATENT OFFICE.

FRANCIS A. OSTLER, OF NEWARK, NEW JERSEY.

SPRAYING TANK.

Application filed December 27, 1920. Serial No. 433,228.

*To all whom it may concern:*

Be it known that I, FRANCIS A. OSTLER, a citizen of the United States, and a resident of Newark, in the county of Essex and State of New Jersey, have invented new and useful Improvements in Spraying Tanks, of which the following is a specification.

This invention relates in general to spraying tanks, one object of the invention being to provide a tank of this character which can be utilized for both washing automobiles or the like and spraying vegetation to destroy insects or combat disease.

Further objects of the invention are to provide a tank of the character described which is adapted to automatically mix soap or spraying compounds with water by the passage of water through the tank; to provide such a tank which can be utilized with an exterior water supply under pressure and also is adapted to serve as a reservoir for liquid which can be ejected from the tank by injecting a fluid under pressure, such as compressed air, into the tank above the surface of the liquid; to provide a novel construction and arrangement of the parts whereby water from an exterior supply can be passed through the tank into contact with soap or a spraying compound so as to form a washing or spraying mixture; to provide means for regulating or varying the strength of the spraying solution thus formed; to provide a means whereby the water from an exterior supply can also be passed at will through the tank clear and without contact or mixing with the soap or spraying compound; and to obtain other results and advantages as may be brought out by the following description.
Referring to the accompanying drawings, in which like numerals of reference indicate the same parts throughout the several views, Figure 1 is a vertical longitudinal sectional view through a spraying tank embodying my invention;

Figure 2 is a top plan view thereof;

Figure 3 is a horizontal sectional view taken on the line 3—3 of Fig. 1, and

Figure 4 is a fragmentary sectional view of one side of the top of the tank showing the same adapted for use with compressed air.

In the specific embodiment of my invention illustrated in the drawings, the numeral 1 designates a tank which is provided with a top 2 permanently secured thereto as by means of rivets, the said top being formed with a charging opening 3 which is adapted to be closed by a detachable cover 4. In the present instance I have shown the opening 3 surrounded by an upstanding boss 5 in which are secured bolts 6 which are adapted to pass through openings 7 in the cover and receive clamping nuts 8 on the outer ends thereof to securely clamp the cover over the opening 3, a gasket 9 being interposed between the cover and the boss 5 to provide a water tight joint. The cover is preferably formed with handles 4ª for the purpose of applying the same to and removing it from the opening 3. It will be understood that any suitable form of closure may be utilized for closing the opening 3, and that the construction shown is merely for the purpose of illustrating one type of closure.

The top is formed at one side thereof with a valve casing 10 which is preferably cast integral with the top and provided with a three-way valve plug 11 which controls a passage 12 communicating at its inner end with the interior of the tank 1, said valve also controlling a second passage 13 connected at its inner end to one end of a vertical pipe 14, the lower end of which is connected as by a gland 15 to a substantially horizontal water supply pipe 16 secured to the interior of the tank as by rivets 17. The valve casing 10 is formed with a threaded boss 18 to which is adapted to be applied a suitable hose, pipe, or the like, to convey the contents of the tank to a suitable point. The inlet pipe 16 is adapted to have threaded in the outer end thereof a pipe coupling 19 to which is adapted to be secured a hose, pipe, or the like for the purpose of conveying water to the tank. The passage 12 in the top 2 has connected thereto a pipe 20 which extends downwardly to a point adjacent the bottom of the tank.

Inwardly of the connection of the pipe 14 the inlet pipe 16 is provided with a removable valve seat 21 with which cooperates a conventional inwardly opening check valve 22 normally against the valve seat 21 by means of the spring 22ª, said check valve allowing water to flow inwardly through the pipe 16, but preventing any back-flow thereof. The inner end of the pipe 16 has fitted to the upper side thereof an inverted conical seat 23, said seat being secured to the pipe by means of a nipple 24 through which communication between the seat and the pipe 16 is obtained.

This seat 23 is adapted to serve as a support for suitable containers for receiving soap and spraying compounds, such as Paris green, or the like. When it is desired to use the spraying tank for the purpose of spraying vegetation with insect destroying compounds or for spraying with any solution of compounds other than soap, I utilize a substantially cylindrical mixing tube 25 which has the outer end thereof open, the inner end 26 thereof being substantially conical in shape to fit the conical seat 23, a gasket or other packing 27 being interposed between the said tube 25 and the seat 23. The conical end 26 of the mixing tube is provided with an opening 28 which registers with the passage through the nipple 24 and through which water from the pipe 16 is admitted to the tube. The tube 25 preferably has a snug fit with the opening 3 in the top 2 and the upper end thereof is engaged by the cover 4 to tightly seat the conical end 26 on the seat 23, a substantially water-tight joint being thus obtained, and the tube is formed with an opening 29 which registers with the passage 12 and serves as an outlet for the mixing tube. A similarly shaped container 30 is loosely fitted within the tube 25, said container being adapted to receive the spraying compound 31. The bottom of the container 30 is corrugated as clearly shown in Figures 1 and 3 and perforations 32 are formed in the bases of the corrugations so as to be spaced from the bottom of the tube 25 as shown in Figure 1, the lower portion of the walls of the container 30 being also perforated. The pipe 16 being connected with an external supply of water, the water will pass by the valve 22 through the nipple 24 and opening 28 in the mixing tube 25, then through the corrugations in the bottom of the container 30 and upwardly in the tube 25 around the walls of the container 30, passing outwardly through the valve 11 to the hose or the like secured to the boss 18, the valve 11 being positioned substantially as shown in Figure 1. In its passage through the tube 25 the water comes into contact with the compound 31 through the perforations in the walls of the container 30, the water dissolving the compound and mixing therewith to form a spraying liquid which is ejected from the tank under the pressure of the incoming water through the pipe 16. The compound 31 is held in a compact mass and is gradually forced downwardly through the container as it is dissolved by means of a weight 34 which is mounted on the top of the compound and loosely slidable in the container 30.

Where no external supply of water under pressure is obtainable, I may charge the tank with water or a mixture of the spraying liquid and eject the same through the valve 11 by compressed air. I may thus provide a conventional inflating valve 35 in the top of the tank which can be connected to any suitable source of compressed air. The passage 12 is closed at its inner end by means of a screw plug 36 as clearly shown in Figure 4 of the drawings, and when compressed air is forced into the tank the liquid therein is discharged through the pipe 20, passage 12 and valve 11 under the pressure of the air, the valve 22 preventing any flow of the liquid outwardly through the pipe 16. Where I utilize compressed air as a discharging element I remove both the mixing tube 25 and container 30 and charge the tank with water, or other cleaning agents such as gasoline or kerosene, or the spraying solution which has been previously mixed. When compressed air is utilized a pressure gage (not shown), is fitted into an opening 37 in the cover 4, said opening being normally closed by a plug 38.

For the purpose of varying the strength of the spraying liquid thus formed I may provide a sleeve 33 which has a snug fit upon the exterior of the container 30 and is adapted to slide longitudinally thereof to cover and uncover the perforations in the container 30 to limit the area of contact of the water with the spraying compound.

When it is desired to use the tank for the purpose of washing vehicles, such as automobiles, or the like, I substitute for the container 30 another container which is perforated for its full length, the said container carrying the soap. The flow of water mixes with the soap in substantially the same manner as above described and the soapy water is used in washing the vehicles in the usual manner, thus eliminating the necessity of a separate bar of soap and a pail or other container, which are at the present time used. After the vehicle or the like has been washed with the soapy water the valve plug 11 is rotated to close the passage 12 and establish communication between the passage 13 and the boss 18, clear water then being allowed to pass outwardly through the valve 11 for the purpose of rinsing the vehicle or the like.

It is also possible to utilize the water under pressure entering the pipe 16 to force gasoline, kerosene or the like, from the tank 1 by removing the mixing tube 25 and container 30 and filling the tank with gasoline or kerosene. The oil having a smaller specific gravity than water and rising to the surface thereof, the water entering the pipe 16 will force the oil out through the passage 12. Proper rotation of the valve 11 will cut off the discharge of oil and allow clear water to flow through the pipe 14, passage 13 and the valve 11 to the discharge pipe or hose to permit alternate or successive discharges of oil and clear water.

While I have shown and described several constructions and uses of my invention, it will be understood that this is for the purpose of illustrating the principles thereof only, and that many modifications and changes can be made in the detail construction of the invention by those skilled in the art without departing from the spirit or scope thereof. Therefore, I do not desire to be understood as limiting myself in the construction and use of my invention except as required by the following claims when construed in the light of the prior art.

Having thus described the invention, what I claim is:

1. A device of the character described including a tank having an opening at the top thereof and an outlet for liquid, a closure for said opening, an inlet pipe adjacent the bottom of said tank having a seat thereon in axial alinement with said opening in the tank and formed with an opening communicating with said pipe, and a container for a substance to be mixed with said liquid having one end thereof mounted in said seat and formed with an opening registering with said opening in the seat and the other end mounted in said opening at the top of the tank, said container being positioned in said tank by said seat and said opening and clamped in such position by said closure of the opening in the tank.

2. A device of the character described including a tank having an inlet and an outlet for liquid, an elongated mixing tube arranged in said tank and having one end thereof in communication with said inlet and the other end in communication with said outlet, a substantially cylindrical container fitted within said mixing tube to receive a substance to be mixed with said liquid and spaced from the walls thereof so that the incoming liquid passes through said mixing tube and into contact with the substance in said container, and a sleeve slidable longitudinally of said container to regulate the area of contact of the liquid with the said substance through the perforations in the container.

3. A device of the character described including a tank having an inlet pipe and an outlet for liquid, a seat mounted on said pipe and having an opening communicating with said pipe, a mixing tube arranged in said tank and having one end thereof mounted on said seat and an opening therein to communicate with the opening in said seat, the other end of said mixing tube having communication with said outlet, and a container for a substance to be mixed with said liquid arranged in said mixing tube and having its bottom seated on the end of said mixing tube adjacent the opening in said seat, the bottom of said container having a plurality of projections exteriorly thereon to space the same from the said end of the tube and a plurality of perforations therein between said projections, so that the incoming liquid passes into said mixing tube between the end thereof and the bottom of said container and contacts with the substance in said container through said perforations.

FRANCIS A. OSTLER.